Sept. 29, 1959 J. P. MAGNIN 2,906,933
MINIMUM REBALANCE TIME ON-OFF CONTROL SYSTEM
Filed Sept. 22, 1955 4 Sheets-Sheet 1

*INVENTOR.*
JEAN P. MAGNIN
BY
*William P. Sherman*
HIS ATTORNEY

Sept. 29, 1959  J. P. MAGNIN  2,906,933
MINIMUM REBALANCE TIME ON-OFF CONTROL SYSTEM
Filed Sept. 22, 1955  4 Sheets-Sheet 2

INVENTOR.
JEAN P. MAGNIN
BY
HIS ATTORNEY

Sept. 29, 1959    J. P. MAGNIN    2,906,933
MINIMUM REBALANCE TIME ON-OFF CONTROL SYSTEM
Filed Sept. 22, 1955    4 Sheets-Sheet 3

*INVENTOR.*
JEAN P. MAGNIN
BY
HIS ATTORNEY

Sept. 29, 1959    J. P. MAGNIN    2,906,933
MINIMUM REBALANCE TIME ON-OFF CONTROL SYSTEM
Filed Sept. 22, 1955    4 Sheets-Sheet 4

INVENTOR.
JEAN P. MAGNIN
BY
HIS ATTORNEY

United States Patent Office 2,906,933
Patented Sept. 29, 1959

2,906,933

MINIMUM REBALANCE TIME ON-OFF CONTROL SYSTEM

Jean P. Magnin, Danbury, Conn., assignor, by mesne assignments, to Schlumberger Well Surveying Corporation, Houston, Tex., a corporation of Texas Application September 22, 1955, Serial No. 535,780

14 Claims. (Cl. 318—28)

This invention relates to control systems and more particularly to feedback control systems of the relay type, which are known as contactor servomechanisms.

In contrast to linear servomechanisms, contactor servomechanisms are characterized by only a few alternative values of control effort and hence may be of correspondingly simple design. In the simplest form, a contactor-type controller, such as one incorporating a relay, serves to switch the full control effort when the detected error exceeds the dead zone of the controller. Because the maximum corrective effort may be developed in response to a minimum correctable error, contactor servomechanisms are capable of correcting small errors far more rapidly than are linear controllers. While this advantage of contactor servomechanisms is less pronounced with large errors for which the corrective effort of linear servos is correspondingly large, the performance of the contactor servo may yet be superior if it can be stabilized to prevent overshooting and oscillation.

Efforts have been made to apply contactor-type controllers to so-called second-order controlled systems for improved speed of response. Such second-order systems comprise a load and power means to adjust some condition of the load, which may be termed the output quantity. This load and the power means together are characterized for analysis by a linear differential equation of second order. While most practical controlled systems are more exactly analyzed by differential equations of third order or higher, a second-order treatment permits use of a controller having a simpler criterion for the reversal of control effort. As described more fully by A. M. Hopkin in an article on "A Phase-Plane Approach to the Compensation of Saturating Servomechanisms," AIEE Transactions, vol. 70, part 1, 1951, at pages 631–39, the switching criterion may be graphically represented by a curve in a so-called phase plane having error and error-rate coordinates. The switching curve is shown to correspond with the trajectory through the origin which is followed by a representing point for the controlled system. The switching trajectory is conveniently manifested in the controller by a single-variable function generator responsive to the error signal. If, under given conditions of system error and error-rate, the representing point lies on one side of the switching trajectory, maximum control effort of one polarity is applied to the load. When this representing point crosses the switching trajectory, the maximum control effort is instantaneously reversed to cause a system response characterized by movement of the representing point along the switching trajectory toward the origin. Ideally, error and error-rate may in this manner be brought simultaneously to zero in a minimum possible time. Actually, however, an instantaneous reversal of control effort cannot be readily achieved. Because the second-order treatment is an oversimplification, a linear mode of operation for small errors is generally provided to reduce consequent overshoot and oscillation.

For controlled systems of third order or higher, so-called programmed controllers have been proposed which effect successive reversals of control effort in a timed sequence to bring error, error-rate, and error acceleration simultaneously to zero in a minimum time. One such system which has successfully been tested is described in H. G. Doll Patent No. 2,463,362, issued March 1, 1949. This patent describes a third-order system having reversals of control effort programmed by a controller incorporating a two-variable function generator. The function which is generated is represented graphically by a switching surface in phase space having error, error-rate and error-acceleration coordinates. This switching surface may be defined by the zero error acceleration contour in the phase plane, together with contours for every other value of error acceleration between positive and negative limits. The bounds of the surface are defined by the contours corresponding to positive and negative maximum values of error acceleration. Each of the contours has an angular point, the locus of these points being known as the final switching curve. Like the zero error acceleration contour, the final switching curve passes through the origin. For convenience, selected trajectories are generally represented as projected upon the phase plane. Using such a representation in variable transparency form, the Doll patent describes a programmed controller in which an optical two-variable function generator develops a signal representing the optimum control effort between maximum limits of either polarity in response to error and error-rate inputs.

While nearly optimum response times may be achieved with systems of the type described in the Doll patent, the two-variable function generator is found to be too complex, bulky, and expensive for many practical control system applications. To avoid the use of a two-variable function generator, a contactor controller has been proposed using a pair of single-variable function generators to represent the respective trajectories which bound the switching surface. Signals derived from each function generator in response to the error are interpolated in accordance with the second derivative of error to yield a signal representing the desired error rate. By supplying a relay with the difference between this desired error rate signal and a signal corresponding to the first derivative of the error, an approximation to an optimum third-order on-off controller is obtained. However, such approximated third-order controller offers little improvement over second-order controllers, since the approximation is least accurate for small errors. Moreover, the likelihood of erroneous control effort reversals is high where the error signal is differentiated twice to obtain an interpolation.

Accordingly, it is an object of the present invention to provide new and improved control systems by which the advantages of a programmed sequence of control effort reversals may be secured free of the disadvantages of the prior art noted above.

Another object of the present invention is to provide new and improved control systems for bringing the error and its derivatives simultaneously to zero in substantially a minimum time without appreciable overshoot.

Another object of this invention is to provide such systems for applications characterized by third-order differential equations, without necessitating the use of a two-variable function generator.

Still another object of the invention is to provide new and improved servo control systems of the programmed type wherein the instants for reversal of switching effort are automatically determined in an economically practical, reliable and accurate manner.

Yet another object of the invention is to provide such programmed control systems having a high quality of performance for small errors and error-rates without the necessity of a linear mode of operation.

Yet another object of the present invention is to provide new and improved programmed position control systems in which the switching criteria represented by a switching surface in phase space may be accurately determined to control the application of substantially optimum corrective effort to a load in response to transient input signals.

These and other objects are attained, in accordance with the invention, by deriving from the system error a signal representing the required system acceleration for minimum response time. This derived signal is compared with a signal representing the existing system acceleration to determine the polarity with which the maximum available control effort is applied to the load. To enable derivation of the signal representing required system acceleration with but one signal-variable function generator, the system error is first transformed into a pair of signals, the values of which are the abscissa and ordinate of the system representing point in the phase plane in relation to coordinates rotationally transformed from the error and error-rate coordinates. The rotational transformation places the transformed ordinate axis at an acute angle to the error-rate coordinate so as to intersect the maximum acceleration trajectories at or outwardly of their angular points. The transformed abscissa signal is supplied to the single-variable function generator in which a function is stored representing a version of the zero error acceleration contour in terms of the abscissa values. A functionally related ordinate signal is thereby derived which, when combined with the transformed ordinate signal, gives a signal representing the required value of system acceleration for minimum response time.

In one embodiment of the invention, the acceleration of the load is compared with the computed signal representing the required error acceleration to yield a control signal. The computed signal is derived by rotationally transforming the error and error-rate signals through an acute angle $\phi$ and taking the difference between the transformed ordinate signal and an ordinate signal which is generated as a function of the transformed abscissa signal. In a second embodiment, a signal representing the torque applied to the load is compared with a computed signal representing the required value of torque. To obtain the computed signal, the error signal is supplied to parallel networks which yield the abscissa and ordinate signals, respectively, representing a rotational transformation through the acute angle $\phi$. An ordinate signal generated in response to the transformed abscissa signal is then added to the transformed ordinate signal to yield the required torque signal. In a third embodiment, operational amplifiers are employed to derive the required torque signal.

The invention will be more perfectly understood from the following detail description of the several representative embodiments, taken in conjunction with the accompanying drawings, in which.

Throughout the figures, like reference numerals are employed to designate similar elements.

Figure 1:
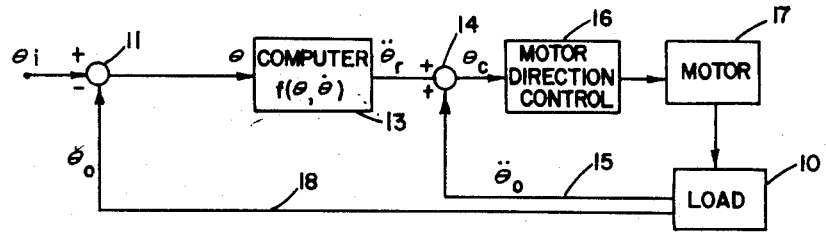
Fig. 1 is a block diagram of a system for practicing the invention.

In Fig. 1 there is shown in block diagram form a relay-type feedback control system arranged in accordance with the invention. This system serves, in a novel manner, to maintain correspondence between an input quantity $\theta_i$ and an output quantity $\theta_o$ which represent, respectively, the desired and the actual conditions of a load 10. The system input $\theta_i$ may be manifested in any convenient manner, such as by an electrical signal, and is supplied together with the output signal $\theta_o$ to an error measuring device 11 for deriving an error signal $\theta$. The error signal $\theta$ represents a lack of correspondence between the input quantity $\theta_i$ and the output quantity $\theta_o$. In order to determine from the condition of the system the correct instants for switching the sense in which control effort is applied to the load 10, the error signal $\theta$ is supplied to a computer 13, the output $\ddot{\theta}_r$ of which is related to the input signal $\theta$ and its derivative $\dot{\theta}$ through the function $f(\theta, \dot{\theta})$ which characterizes the above-described switching surface in phase space.

The computed signal $\ddot{\theta}_r$ obtained from the computer 13 represents the required error acceleration for given values of $\theta$ and $\dot{\theta}$ to ensure a minimum response time without appreciable overshoot. By means of a second error measuring device 14, this value $\ddot{\theta}_r$ of required error acceleration is compared with a signal $\ddot{\theta}_o$ representing actual output acceleration. The signal $\ddot{\theta}_o$ may be transmitted via feedback path 15, for example, from an accelerometer (not shown) or other suitable device for producing an acceleration signal corresponding to the acceleration of the load 10. Because the computed signal $\ddot{\theta}_r$ represents error acceleration which is the difference between input and output accelerations ($\ddot{\theta}_i - \ddot{\theta}_o$), the signal $\ddot{\theta}_r$ is simply added to the signal $\ddot{\theta}_o$ to obtain a control signal $\theta_c$ equal to the difference $\ddot{\theta}_r - \ddot{\theta}_o$, assuming that input acceleration $\ddot{\theta}_i$ may be disregarded.

Should the output acceleration $\ddot{\theta}_o$ have a value greater than the signal $\ddot{\theta}_r$ derived from computer 13, a negative control signal $\theta_c$ is obtained. The representing point for the system in phase space lies, in this instance, on the side of the switching surface which signifies a requirement that a positive corrective effort be applied to the system load 10, where the convention is adopted that a positive corrective effort produces a corresponding positive load acceleration to diminish the error-rate. Conversely, a positive control signal $\theta_c$ signifies that a negative corrective effort is required. The polarity of the control signal $\theta_c$ then signifies the direction in which control effort should be applied to the load. To sequence the sense in which control effort is applied, control signal $\theta_c$ is supplied to a motor direction control 16 which may, for example, be a relay amplifier serving to energize a power device 17, such as a motor, in either of two directions. For a positive control signal, the motor 17 is energized in the negative sense, and for a negative control signal, in the positive sense. In addition to the feedback path 15 for the output acceleration signal $\ddot{\theta}_o$, there is provided a feedback path 18 for supplying the error measuring device 11 with a signal representing the output quantity $\theta_o$. Depending upon the form of error measuring devices used, the feedback paths 15 and 18 may be of either an electrical or a mechanical type.

The elements of the servomechanism of Fig. 1 which have been described may be considered as divided between a controller and a controlled system, the latter including both the load 10 and the motor 17. The controlled system may have a variety of forms, any of which may be characterized approximately by a third-order differential equation. In mathematically characterizing the controlled system by the ratio between its output and its input, that is, by its transfer function, such characterizing transfer function is found to include at least one integration. Merely to exemplify the principles of the invention and not in limitation of its scope, the load may in one application be a steered body such as is described in the above-cited Doll patent. The controlled variable is then the angular position of the steering member, the steering member being assumed to have angular limits of deflection in either direction and to be driven between these limits during a reversal of control effort as a linear function of time. The transfer function for such a position control system may be expressed in the form of a Laplace transform as $1/s^3$, which represents a triple integration.

In another application, the motor 17 may be a D.C. field-controlled motor having a constant armature current and driving an inertia load. The transfer function in Laplace transform notation is then $1/s^2(Ts+1)$, where T is the time constant for the motor field winding and $s^2$ represents a double integration. It may be observed, therefore, that the invention, while applicable to servo controlled systems generally, is designed specifically to yield optimum response times for third-order servo systems. In contrast to a second-order system in which reversal of maximum control effort is assumed to be instantaneous, such third-order systems are more realistically treated as requiring a finite time for a control effort reversal.

Figure 2:
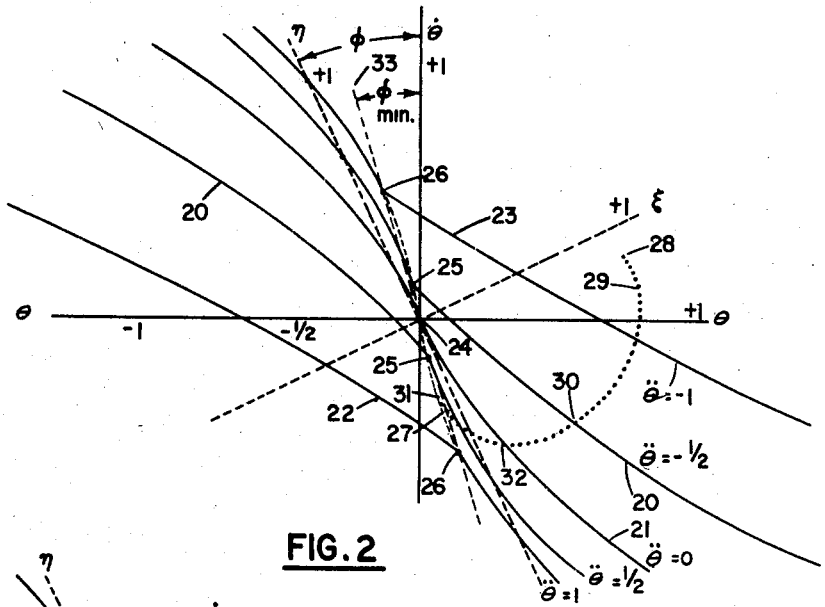
Fig. 2 is a graphical representation of a phase-plane diagram for a third-order system, illustrating the switching surface as projected onto the phase plane.

In Fig. 2 is shown a graphical representation of the switching surface for a third-order contactor servomechanism. While a third-order system is properly characterized in three-dimensional phase space by a rectilinear plot of error, error-rate and error acceleration, the operation of the system may be understood from the phase plane diagram of Fig. 2 in which the switching surface is characterized by representative contours 20–23, each corresponding to a different value of error acceleration. Only one of these contours, namely, the zero error-acceleration contour 21 lies in the phase plane as defined by the error and error-rate coordinates, the remainder of the contours being projected onto the phase plane. Defining the bounds of the switching surface are a contour 22 representing a maximum positive error acceleration and a contour 23 representing a maximum negative error acceleration. The remaining contours 20 represent intermediate values of error acceleration. For convenience, the coordinates are plotted in terms of normalized units extending between plus and minus 1. Of the constant error-acceleration contours 20–23 which comprise the switching surface, only the contour 21 corresponding to zero error-acceleration passes through the origin. This contour 21 has an inflection point 24 at the origin corresponding to a change in the sense of its curvature. The other contours have respective angular points 25—26 where not only a reversal in curvature occurs but also a discontinuity in the magnitude of the curvature. The angular points for the bounding trajectories 22 and 23 are particularly significant to this invention and are distinguished by reference numerals 26.

The angular points 25 and 26 together with the inflection point 24 define the locus of a so-called final switching curve 27. The switching curve 27 then marks a reversal in curvature of the switching surface. The general configuration of the switching surface shown in Fig. 2 is characteristic of any third-order controlled system. For a given controlled system of third-order, however, the switching surface has a unique configuration affording criteria for reversals of maximum control effort required to drive the system from arbitrary initial conditions of error, error-rate and error acceleration to the origin in a minimum time. Reference is made to an article by Bogner and Kazda on "An Investigation of the Switching Criteria for Higher Order Contactor Servomechanisms" in "Applications and Industry" at pp. 118–127, published July 1954, by the AIEE for a mathematical definition of the switching surface for a particular third-order servo.

Graphically, the conditions of error and error-rate for a control system are conveniently represented by the position of a point 28, termed the representing point. Accordingly, the switching surface may be graphically determined by plotting the paths followed by the representing point when an optimum sequence of control effort reversals is applied to bring the point to the origin. Analog computer techniques may be used in a well known manner to facilitate such plotting. With the representing point initially at one of the angular points 26, reversal of maximum control effort causes the representing point to follow the final switching curve 27, reaching the origin just as the control effort goes to zero. The switching curve 27 is thus the unique path which the representing point must follow to reach the origin during a reversal of maximum control effort. Similarly, the switching surface defines the locus of paths which the representing point must follow during a reversal of control effort to reach the switching curve 27. Thus, the switching surface is likewise uniquely defined. Since maximum control effort is applied at every instant except during a control effort reversal, the response time of the controlled system, as may be expected, is a minimum possible value and the system response is free of overshoot.

Taking the control system under arbitrary initial conditions given by the position of the representing point 28 in Fig. 2, the necessary sequence of control effort reversals for an optimum response time is next considered. With the point 28 disposed above contour 23 corresponding to maximum negative error acceleration, a positive control effort is required which will cause the representing point 28 to follow the dotted path 29. At a point 30 the path 29 intersects the switching surface. At this instant, reversal of the control effort is initiated and the path of the representing point intersects the contours in a time sequence corresponding to the continuously varying value of control effort. When intersection with the switching curve 27 occurs, such as at point 31, reversal of the control effort is again initiated, the representing point reaching the origin as the control effort goes to zero. Output acceleration actually changes sign at point 32 corresponding to the intersection of the trajectory with the zero-acceleration contour.

Figure 3:
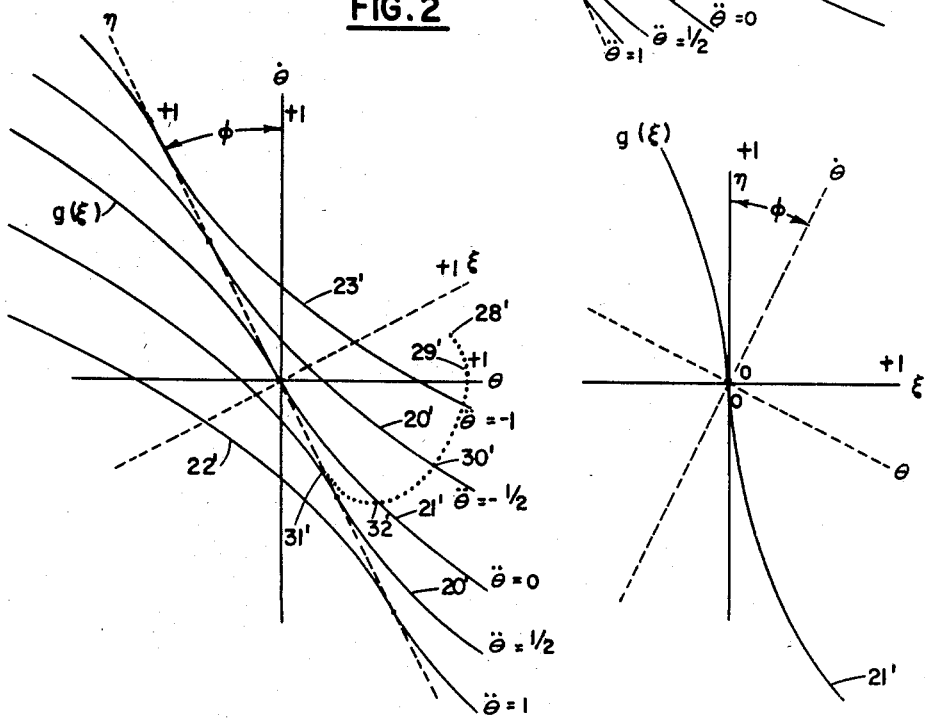
Fig. 3 is a graphical representation of the phase-plane diagram of Fig. 2 as approximated in accordance with this invention.

In order that the controller may sequence reversals of the control effort which will yield substantially the optimum response of the controlled system just described, the switching surface must be accurately represented in the computer 13. While as a general rule, a two-variable function generator is required to represent a three-dimensional surface, the computer 13 of this invention serves to accurately approximate this switching surface using only a single-variable function generator. For an understanding of the manner in which this accurate approximation is obtained, reference is made to Figs. 2 and 3 showing, respectively, the true and the approximated versions of the switching surface. In Fig. 2, the representative contours 20–23 are observed to have somewhat similar configurations due to their reversals of curvature. The contours for low values of error-acceleration have a close similarity to the zero-acceleration contour. Since a contactor servomechanism affords an improved response time over comparable linear controllers primarily for small errors, that is, in the region about the origin of phase space, an accurate reproduction of the switching surface in the region immediately about the origin is highly desirable.

In accordance with the principles of the present invention, a very accurate approximation is achieved in this region by translating a version 21' (Fig. 3) of the zero error-acceleration contour 21 along an ordinate axis $\eta$ rotationally displaced from the error-rate coordinate $\dot{\theta}$ by an acute angle $\phi$. At the origin, the version 21' of the zero error-acceleration trajectory is substantially tangent to this ordinate axis $\eta$. The abscissa axis is identified in Fig. 3 as $\xi$, the axes $\xi$ and $\eta$ representing a rotational transformation of the respective coordinates $\theta$ and $\dot{\theta}$ through the angle of $\phi$. While the angle $\phi$ is generally chosen to provide the nearest approximation to the switching surface which may be achieved, it is necessarily at least as great as the angle $\phi_{min}$ included between the error-rate coordinate and a line 33 through the angular points 26. In general, however, the axis must be rotated through an angle greater than $\phi_{min}$ to achieve a good approximation to the bounding contours 22 and 23, but clearly not greater than 45°.

The illustrated zero error-acceleration contour 21 may be represented mathematically by the expression:

(1) $\qquad -\dot{\theta}^3 = \theta|\theta|$ and is seen to be symmetrical about the origin as is the entire switching surface. About their respective angular points, on the other hand, the bounding contours 22 and 23 are clearly non-symmetrical and thus differ in configuration from the zero error-acceleration contour 21. To conform the modified version 21' of the zero error-acceleration contour more closely to the bounding contours 22 and 23, the slope of the contour 21' is reduced for large values of error. In consequence, the approximated bounding contours 22' and 23', as well as the intermediate contours 20' together define a version of the switching surface which accurately approximates the switching surface of Fig. 2 and is found to yield nearly optimum performance characteristics.

Figure 4:
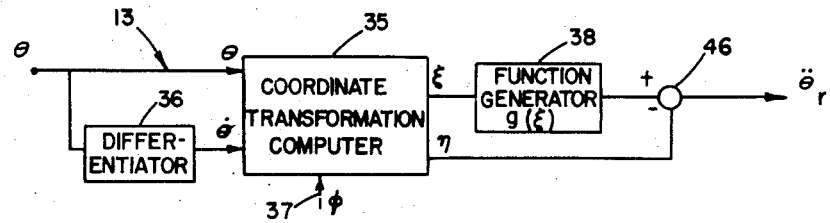
Fig. 4 is a block diagram of the computer shown in Fig. 1.
Figure 5:
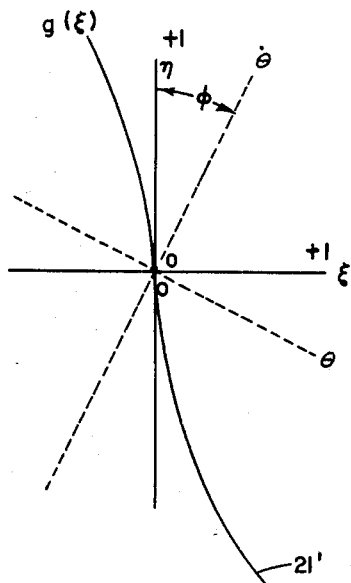
Fig. 5 is a graphical representation of the function stored in the function generator shown in Fig. 4.

To provide a physical representation of the approximated switching surface of Fig. 3, the computer 13 is shown in Fig. 4 to comprise a coordinate transformation computer 35 having the error signal $\theta$ applied to one input and an error-rate signal $\dot{\theta}$ derived from a differentiator 36 applied to the other input. While the coordinate transformation computer 35 may have a variety of convenient forms, for purposes of illustration it may have a construction disclosed at page 280 of "Electronic Analog Computers," by Korn and Korn, published in 1952 by McGraw-Hill Book Co. This computer incorporates four trigonometric function potentiometers gang-driven by a shaft (represented in Fig. 4 at 37) having a rotational displacement representing the angle of transformation. The outputs of first sine and cosine potentiometers are supplied to a first summing amplifier to derive the transformed abscissa, while the outputs of second sine and cosine potentiometers are supplied to a second summing amplifier to derive a transformed ordinate signal. With the shaft 37 displaced through an angle $\phi$, the coordinate transformation computer 35 may be characterized by the following mathematical relationships:

(2) $\qquad \xi = \theta \cos \phi + \dot{\theta} \sin \phi$
(3) $\qquad \eta = -\theta \sin \phi + \dot{\theta} \cos \phi$ While the angle $\phi$ may be adjusted to obtain an optimum performance in any given application, it can be considered a fixed quantity such that expressions 2 and 3 serve to define linear combinations of error and error-rate yielding the transformed abscissa signal $\xi$ and ordinate signal $\eta$. The transformed abscissa signal $\xi$ is supplied to a single-variable function generator 38, the output of which is related to the input signal $\xi$ by the function $g(\xi)$. The function $g(\xi)$ is graphically represented in Figs. 3 and 5 by the rotationally transformed version 21' of the zero error-acceleration contour 21, which version 21' is plotted against the rotationally transformed coordinates $\xi$ and $\eta$, the $\theta$ and $\dot{\theta}$ coordinates being shown in Fig. 5 only for purposes of orientation.

Figure 6:
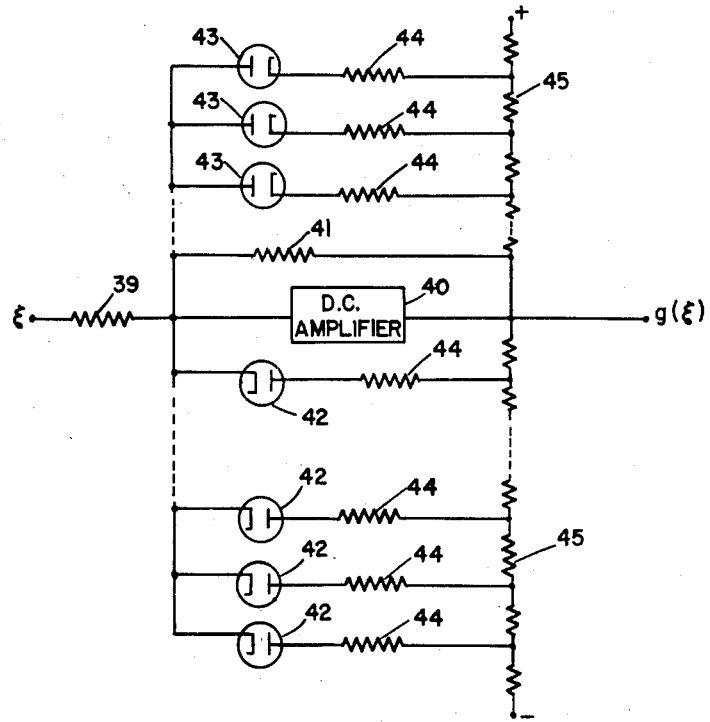
Fig. 6 is a schematic diagram of the function generator shown in Fig. 4.

To represent the non-linear function $g(\xi)$ accurately, the function generator 38 may have a variety of designs, one design being shown in Fig. 6 and comprising an operational amplifier with non-linear feedback loops. This circuit comprises a high valued input resistor 39 for coupling the transformed abscissa signal $\xi$ to a D.C. operational amplifier 40, which may be of any well-known form. Constituting the feedback circuit for the amplifier 40 is a high valued resistor 41 together with a network of parallelled diodes 42, 43, each diode having an associated series resistor 44. Each of resistors 44 connects with a tap point on a tapped potential divider 45 to which is applied a D.C. potential. In a well-known manner, the portions of the feedback circuit including diodes 42 determine the function $g(\xi)$ for negative values of $\xi$, while the portions of the feedback circuit including diodes 43 determine this function for positive value of $\xi$, the resistor 41 serving to determine the slope of the function through the origin. Accordingly, from the output of the operational amplifier 40 is derived a generated signal representing the ordinate of the curve $g(\xi)$.

Referring again to Fig. 4, the transformed ordinate signal is combined in an error measuring device 46 with the generated ordinate signal $g(\xi)$ to yield the signal $\ddot{\theta}_r$ representing the required error-acceleration, in accordance with the following expression:

(4) $\qquad \ddot{\theta}_r = g(\xi) - \eta$

This expression represents a linear translation of the curve $g(\xi)$ along the $\eta$ axis giving the family of contours shown in Fig. 3. The expression may be interpreted as meaning that, for a given value of $\xi$, the required error-acceleration $\ddot{\theta}_r$ is negative if the transformed ordinate signal $\eta$ exceeds the generated ordinate signal $g(\xi)$, and vice versa. In other words, if the representing point for the system is in the vicinity of the contour 23', for example, the error-acceleration should be negative in accordance with the adopted convention with respect to polarity. The required error acceleration signal $\ddot{\theta}_r$ is then uniquely determined in accordance with the input values of $\theta$ and $\dot{\theta}$, the value of $\ddot{\theta}_r$ being determined in accordance with the function $f'(\theta, \dot{\theta})$ graphically represented by the approximated switching surface.

In an exemplary operation of the system illustrated in Figs. 1, 4 and 6, an input signal $\theta_i$ is applied to the error measuring device 11 to cause the production of particular values of error $\theta$ and error-rate $\dot{\theta}$ which are graphically represented by the position of a point 28' in the phase plane. Assuming that this point 28' has error and error-rate coordinates corresponding to the coordinates of the representing point 28 in Fig. 2, such point 28' will move with time through a path 29' substantially identical to the path 29 and intersecting the switching surface at a point 30'. The path of the representing point thereafter will intersect the coordinate axis $\eta$ at a point 31' and follow the same, within a good approximation, to the origin of the phase plane.

Before intersection with the point 30', the representing point 28' has a position with respect to the approximated switching surface which requires a negative error acceleration and, consequently, a positive control effort. At the point 28' in particular, the signal derived from the function generator 38 has a large negative value which results in a negative signal $\ddot{\theta}_r$. As the output acceleration $\ddot{\theta}_o$ is initially zero, a negative control signal $\theta_c$ is derived from the error measuring device 14. Application of this negative control signal $\theta_c$ to the motor direction control 16 energizes the motor 17 in a positive sense to apply an increasing control effort, such as a torque, to the load 10. The output acceleration $\ddot{\theta}_o$ is thereby increased towards its maximum limit.

As the representing point 28' reaches the intersection point 30' with the approximated switching surface, the computed signal $\ddot{\theta}_r$ of error-acceleration increases toward a negative value, while the output acceleration $\ddot{\theta}_o$ rises toward the same value in the positive sense and is tending to become larger. Accordingly, the polarity of the control signal $\theta_c$ reverses to become positive, thereby causing the applied control effort to change from positive to negative. The computed signal $\ddot{\theta}_r$ continues to increase while the output acceleration $\ddot{\theta}_o$ diminishes to a negative value. When the representing point intersects the rotated ordinate axis $\eta$ at point 31', the computer error acceleration signal $\ddot{\theta}_r$ tends to decrease, so that the negative output acceleration $\ddot{\theta}_o$ predominates. The polarity of the control signal $\theta_c$ becomes negative again and the control effort changes from negative toward positive. With the approach of the representing point toward the origin, the control effort goes to zero. The load having been accelerated up to point 32', the intersection of the trajectory with the zero-acceleration contour, is thereafter decelerated until error, error-rate, error-acceleration and control effort simultaneously reach zero.

Upon arrival of the representing point at the origin, the control signal $\theta_c$ tends to oscillate between negative and positive values at a rapid rate but with a very small amplitude. If desired, the motor direction control 16 may be provided with a sufficient dead zone so that it does not correspondingly reverse the control effort at a rapid rate. However, such a reversal of control effort does not result in any error, as the effective integrations of the control system average the oscillating control effort for a zero load displacement.

If desired, the value of the angle $\phi$ through which the shaft 37 is displaced to determine the rotational transformation of the signals $\theta$ and $\dot{\theta}$ may be varied manually or automatically to optimize the approximation to the switching surface in dependence upon the magnitude of the error developed in the system. However, a fixed value of $\phi$ at least equal to the angular displacement of the angular points 26 from the error-rate coordinate may be selected which provides substantially optimum performance over widely varying conditions of error and error-rate.

Figure 7:
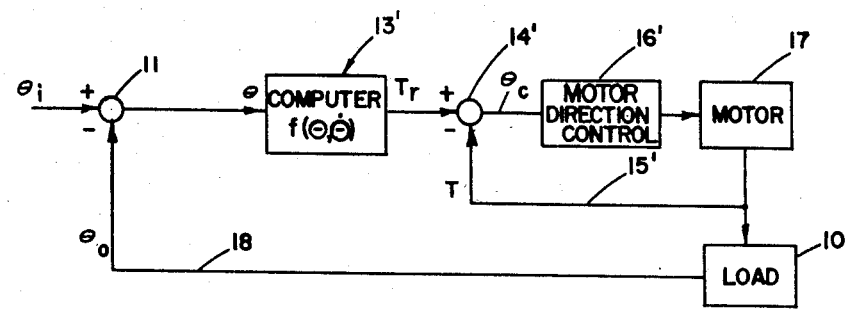
Fig. 7 is a block diagram of a control system in accordance with another embodiment of the invention.
Figure 8:
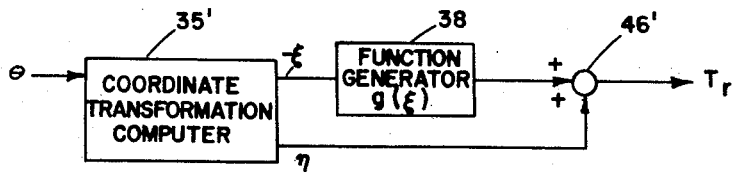
Fig. 8 is a block diagram of the computer shown in Fig. 7.

In Fig. 7 is shown another embodiment of the invention which differs from the embodiment of Figs. 1, 4 and 6 in the manner of deriving control signal $\theta_c$. This embodiment incorporates a modified computer 13' for generating the function $f'(\theta, \dot{\theta})$ represented by the approximated switching surface of Fig. 3. Derived from the computer 13' is a signal $T_r$ which is the negative of signal $\ddot{\theta}_r$ derived from the computer 13 of Fig. 1. This signal $T_r$ represents the required value of control effort or torque. It is supplied to an error measuring device 14'. There is also supplied to the error measuring device 14' a signal $T$ representing the control effort or torque transmitted by the motor 17 to the load 10. This torque signal $T$ is coupled to the error measuring device 14' by a feedback path 15'. It will be appreciated that the torque signal $T$ is generally proportional to the output acceleration signal $\ddot{\theta}_o$ and is frequently more readily obtained than a measurement of output acceleration $\ddot{\theta}_o$. For example, when the load 10 is a steered body subject to a torque determined by the angular deflection of a steering member, the torque signal $T$ may simply be a measure of the angular deflection obtained by any convenient means, such as a potentiometer (not shown).

As the computed signal $T_r$ is algebraically combined in the error measuring device 14' with the negative value of the signal $T$, the control signal $\theta_c$ in the system of Fig. 7 will have the opposite polarity under given conditions from the control signal $\theta_c$ of Fig. 1. Accordingly, a motor direction control 16' is employed having a reverse sense of operation such that for a positive control signal $\theta_c$, the motor 17 is energized to exert a positive control effort, that is, a positive torque.

The computer 13' includes a modified coordinate transformation computer 35'. This computer 35' serves, like the computer 35, to generate abscissa and ordinate signals $\xi$ and $\eta$ representing a rotational transformation of the error and error-rate coordinates but differs in having a single input signal, namely, the error signal $\theta$, and in having the form more particularly shown in Fig. 9. As the computer 35' actually generates a negative abscissa signal $\xi$, the ordinate signal $\eta$ is combined with the generated signal $g(\xi)$ additively in a summing device 46' of any convenient design to yield signal $T_r$ of proper polarity.

Figure 9:
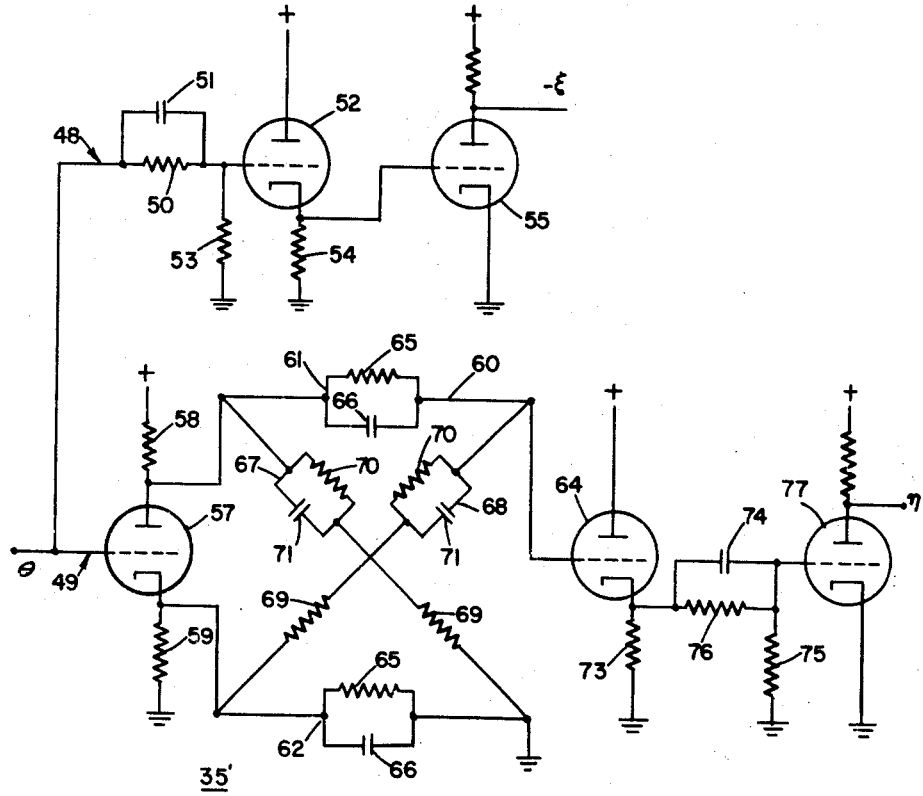
Fig. 9 is a schematic diagram of the coordinate transformation computer of Fig. 8.

Referring now to the details of the coordinate transformation computer 35' shown in Fig. 9, the error signal $\theta$ is applied in parallel to a first network 48 for deriving the signal $\xi$ and a second network 49 for deriving the signal $\eta$. The first network 48 comprises a resistor 50 and capacitor 51 in parallel for coupling the error signal to the control grid of a triode 52. While resistor 53 connecting the control grid to ground and resistor 51 define a voltage divider, the resistor 53 and capacitor 51 serve as a differentiating circuit. Triode 52 is operated as a cathode follower and has a cathode resistor 54 for developing a signal which is applied to the control grid of an amplifier represented by triode 55. The gain of the amplifier 55 is adjusted so that the signal $\xi$ derived from its plate circuit has the proper amplitude in relation to the error signal $\theta$. By a suitable adjustment of the parameters of this first network 48, a negative version of the signal $\xi$ is obtained in accordance with the following expression:

(5) $\xi = \cos\phi \, (\theta + \dot{\theta} \tan\phi)$ which is seen to be equivalent to expression 3. Assuming for example, that the tangent of the angle $\phi$ is 2, the resistor 50 may be 5 megohms, the capacitor 51 may be 0.1 microfarads, the resistor 53 may be 50 kilohms and the gain of the amplifier 55 may be 44.7. The cathode follower 52 serves merely to decouple the lead network 50, 51, 53 from the amplifying triode 55. Thus the output of amplifier 55 is the signal $\xi$ with a negative polarity.

The second network 49 includes a phase splitter comprising triode 57 with equal plate and cathode resistors 58, 59, the grid of triode 57 being driven by the error signal $\theta$. The push-pull outputs of the triode 57 are supplied to a lattice network 60 including parallel RC circuits 61 and 62 respectively connecting the plate and cathode of triode 57 with the grid of a cathode follower triode 64 and with ground. Each of circuits 61 and 62 comprises a resistor 65 and capacitor 66. Affording cross connections are parallel RC circuits 67 and 68, each in series with a corresponding resistor 69. Each of the circuits 67, 68 comprises a resistor 70 and a capacitor 71. Connected across cathode resistor 73 of the cathode follower triode 64 is a compensating lead network comprising capacitor 74 shunted by a resistor 76 and a grounded resistor 75. The junction of resistor 75 and 76 is connected to the control grid of an amplifier represented by triode 77 which provides suitable amplification to develop the output signal $\eta$. The parameters of the network 49 are selected to obtain a value of $\eta$ according to the following expression:

(6) $\eta = \cos\phi \, (-\theta \tan\phi + \dot{\theta})$

Suitable values for the parameters of the second network 49 may readily be selected by those skilled in the art. As an example, however, appropriate values are tabulated below for the tangent of $\phi$ equal to 2:

Resistors 65 _____ megohms__ 3.5
Capacitors 66 _____ microfarads__ 0.285
Resistors 69 _____ megohms__ 2
Resistors 70 _____ do____ 0.5

| | |
|---|---|
| Capacitors 71 _____ microfarads__ | 2 |
| Capacitor 74 _____ do____ | 1 |
| Resistor 75 _____ kilohms__ | 34 |
| Resistor 76 _____ megohms__ | 3.3 |
| Gain of amplifier 77 _____ | 536.4 |

Depending upon the frequency range and other performance considerations, the coordinate transformation computer 35′ is, of course, subject to a wide variety of modifications.

Figure 10:
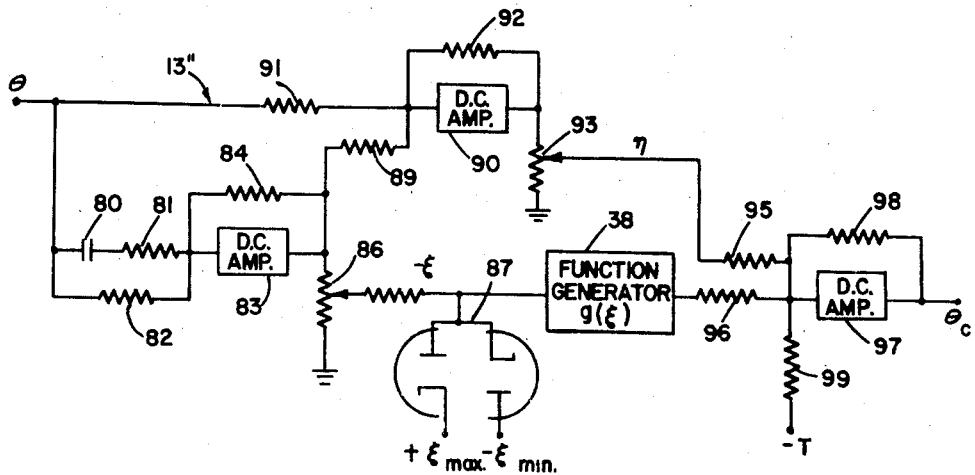
Fig. 10 is a schematic diagram of another embodiment of the computer shown in Fig. 7.

Another form of the computer for generating the function $f'(\theta, )$ is shown in Fig. 10 and identified by the reference numeral 13″. To obtain a signal representing the sum of the error signal and its first derivative with appropriate coefficients, the error signal $\theta$ is supplied to an operational amplifier network comprising capacitor 80 and resistor 81 in series, both shunted by resistor 82 connected with the input of an operational amplifier 83 having a resistor 84 in its feedback circuit 84. The output of the D.C. amplifier 83 is coupled to the function generator 38 through a voltage-dividing potentiometer 86, and a double-diode limiter 87, which serves to limit the positive and negative excursions of the signal supplied to the function generator 38. By an appropriate selection of parameters, the signal supplied to the function generator 38 is the negative value of the rotationally transformed abscissa signal $\xi$. The function generator 38, in response to the signal $-\xi$, serves to generate a negative ordinate signal having a value represented by the function $g(\xi)$.

By a parallel connection, the output of the operational amplifier 83 is coupled through input resistor 89 to another operational amplifier 90. The error signal $\theta$ is also coupled to this operational amplifier 90 via an input resistor 91. By suitably proportioning the input resistors 89 and 91 in relation to resistor 92 in the feedback circuit of operational amplifier 90, a signal is derived from the operational amplifier 90 which, when divided by a potentiometer 93 connected to the output of amplifier 90, becomes the rotationally transformed ordinate signal $\eta$.

To effect a summing of the transformed ordinate signal $\eta$ and the generated ordinate signal derived from function generator 38, these signals are coupled by respective input resistors 95, 96 to an operational amplifier 97 having a resistor 98 in its feedback circuit. The same operational amplifier 97 also serves in lieu of the error measuring device 14′. Thus, a negative version of the signal T representing the control effort applied to the load is coupled via an input resistor 99 to the operational amplifier 97. Accordingly there is derived from the operational amplifier 97 the control signal $\theta_c$ having a correct polarity for operation of the motor direction control 16′ of Fig. 7.

To exemplify the operation of the circuit of Fig. 10, the values of the parameters may be assumed as follows, for the case of tangent $\phi$ equalling 2:

| | |
|---|---|
| Resistors 84, 92, 95, 96 and 98 _____ megohms__ | 1 |
| Resistors 82 and 89 _____ do____ | 2 |
| Resistor 91 _____ do____ | 5 |
| Resistor 81 _____ do____ | 30 |
| Capacitor 80 _____ microfarads__ | 10 |
| Setting of potentiometers 86 and 93 _____ | 0.447 |

With these values, the output of the operational amplifier 83 is, in accordance with well-known theory set forth, for example, in the above-cited text by Korn and Korn, equal to $-(2\theta+\dot{\theta})$. As derived from the potentiometer 86, the output is $-0.447(2\theta+\dot{\theta})$, which is equal to $-\xi$ in accordance with expression (5) given above. In response to this signal $-\xi$, the function generator 38 generates an ordinate signal in accordance with the function $g(\xi)$.

The signal $-(2\theta+\dot{\theta})$ derived from amplifier 83 is also supplied to the summing amplifier 90 to undergo a gain of 2. At the same time, the error signal $\theta$ undergoes a gain of 5. Consequently, the output derived from the potentiometer 93 is equal to $0.447(\dot{\theta}-2)$, which is a correct value of $\eta$ according to Equation 6 for the assumed value of $\phi$. The control signal $\theta_c$ is derived from the D.C. amplifier 97 by a summing operation in a well-known manner. For other values of $\phi$, the parameters employed in the network of Fig. 10 will, in general, be altered, although the relationship of the summing and differentiating amplifiers may remain the same, if desired.

While several representative embodiments of the invention have been shown and described, it will be evident that the invention is subject to additional modifications within its scope and principles. Thus, in lieu of a diode-network type of function generator, a function generator of the tapped potentiometer type may instead be employed. The use of tapped potentiometers is described, for example, in the above-cited text by Korn and Korn in Chapter 6 at pages 261–270. Other suitable types of function generators are described in the same Chapter 6.

Another form of coordinate transformation computer which may suitably be employed with this invention is described at page 283 of the cited text and is termed a resolver, such resolver having the form of a rotatable transformer with two stator windings and two rotor windings, the angular displacement of the rotor corresponding with the rotational transformation of coordinates. Various other modifications may occur to those skilled in the art.

The invention, accordingly, is not to be limited to the particular embodiments shown and described but is of a scope defined in the appended claims.

I claim:

1. In a servomechanism, the combination comprising a load, reversible power means for applying a corrective effort to said load, there being a characteristic switching surface for said load and power means including a contour in the phase plane, means responsive to a lack of correspondence between said load and an input signal for producing an error signal, computer means responsive to said error signal for providing an abscissa signal and an ordinate signal representing a rotational transformation of said error signal and its derivative respectively through an acute angle, said computing means including means responsive to said abscissa signal for generating an ordinate signal which is a function of said abscissa signal represented graphically by a version of said contour, means for algebraically combining said transformed ordinate signal and said generated ordinate signal to provide a computed signal, and means responsive to said computed signal for energizing said power means to apply a corresponding corrective effort to said load.

2. In a servomechanism, the combination comprising a load, reversible power means for applying corrective effort to said load, there being a characteristic switching surface for said load and power means including a contour in the phase plane defined by rectilinear error and error-rate coordinates, means responsive to a lack of correspondence between said load and an input signal for producing an error signal, computer means responsive to said error signal for providing an abscissa signal and an ordinate signal representing a rotational transformation of said error signal and its first derivative respectively through an acute angle, said computer means including function generating means responsive to said abscissa signal for generating an ordinate signal which is a function of said abscissa signal represented graphically by a version of said contour which is substantially tangent to the rotationally transformed ordinate at the origin, means for algebraically combining said transformed ordinate signal and said generated ordinate signal to provide a computed signal, and means responsive to said computed signal for energizing said power means to apply a corresponding corrective effort to said load.

3. In a servo control system for controlling the reversal of corrective effort applied to a load, the combination comprising means responsive to a lack of correspondence between said load and an input signal for producing an error signal, computer means responsive to said error signal for providing an abscissa signal and an ordinate signal representing a rotational transformation of said error signal and its first derivative respectively through an acute angle, said computer means including means responsive to said abscissa signal for generating an ordinate signal which is a function of said abscissa signal represented graphically by a rotationally transformed version of a contour defined by the intersection of a characteristic switching surface for said load with a plane defined by error and error-rate coordinates, means for algebraically combining said transformed ordinate signal and said generated ordinate signal to provide a computed signal, means for comparing said computed signal with a signal representing the corrective effort applied to said load to provide a control signal, and means responsive to the sense of said control signal for reversing the application of corrective effort to said load.

4. In a servo control system for controlling the reversal of corrective effort applied to a load, the combination comprising means responsive to a lack of correspondence between said load and an input signal for producing an error signal, computer means responsive to said error signal for providing an abscissa signal and an ordinate signal representing a rotational transformation of said error signal and its first derivative respectively through an acute angle, said computer means including function generating means responsive to said abscissa signal for generating an ordinate signal which is a function of said abscissa signal represented graphically by a zero error-acceleration contour which with contours corresponding to other values of error-acceleration defines a switching surface characteristic of said load, said zero error-acceleration contour being taken in relation to coordinates rotationally transformed in correspondence to the transformation of said error signal, means for algebraically combining said transformed ordinate signal and said generated ordinate signal to provide a computed signal, means for comparing said computed signal with a signal representing the corrective effort applied to said load to provide a control signal, and means responsive to the sense of said control signal for reversing the application of maximum available corrective effort to said load.

5. In a servo control system, the combination as defined in claim 4, wherein said characteristic switching surface is bounded by contours corresponding to maximum negative and positive values of error acceleration, each of said contours having an angular point, said acute angle being at least as great as the angle included between the error-rate coordinate and a line through said angular points projected into the phase plane.

6. In a servomechanism including a load and power means therefor having a response characterized by a switching surface graphically represented in the phase plane by contours for various values of error acceleration including zero and maximum values of either polarity, the combination comprising computer means responsive to an error signal representing a lack of correspondence between said load and an input signal for providing an abscissa signal and an ordinate signal representing a rotational transformation of said error signal and its first derivative respectively through an acute angle, said acute angle being defined by the error-rate coordinate and an ordinate axis intersecting said maximum value contours outwardly of their angular points, said computer means including means responsive to said abscissa signal for generating an ordinate signal which is a function of said abscissa signal represented graphically by a version of said zero error acceleration contour tangent at the origin to said ordinate axis, means for algebraically combining said transformed ordinate signal and said generated ordinate signal to provide a computed signal, means for comparing said computed signal with a signal representing the corrective effort applied to said load to provide a control signal, and means responsive to changes in the sense of said control signal for reversing the application of corrective effort to said load.

7. In a servo control system for controlling reversal of the corrective effort applied to a load, computer means responsive to an error signal for providing an abscissa signal and an ordinate signal representing a rotational transformation of said error signal and its first derivative respectively through an acute angle, said computer means including means for adjusting the value of said acute angle, said computer means further including means responsive to said abscissa signal for generating an ordinate signal which is a function of said abscissa signal represented graphically by a version of a contour characterizing the response of said load in relation to abscissa and ordinate axes which are rotationally transformed from error and error-rate coordinates through said acute angle, means for algebraically combining said transformed ordinate signal and said generated ordinate signal to provide a computed signal, means for comparing said computed signal with a signal representing the acceleration of said load to provide a control signal, and means responsive to a change in the sense of said control signal for reversing the application of corrective effort to said load.

8. In a servo control system for controlling reversal of the corrective effort applied to a load, the combination comprising computer means responsive to an error signal for providing an abscissa signal and an ordinate signal representing a rotational transformation of said error signal and its first derivative respectively through an acute angle, said computer means including a first network for generating said abscissa signal and a parallel network for generating said ordinate signal, said computer means further including means responsive to said abscissa signal for generating an ordinate signal which is a function of said abscissa signal represented graphically by a version of a contour corresponding to zero system error acceleration plotted in relation to the transformed abscissa and ordinate axes, means for algebraically combining said transformed ordinate signal and said generated ordinate signal to provide a computed signal, means for comparing said computed signal with a signal representing the torque applied to said load to provide a control signal, and means responsive to a change in the sense of said control signal for reversing the application of corrective effort to said load.

9. In a servo control system for controlling reversal of the corrective effort applied to a load, the combination comprising means responsive to an error signal for providing an abscissa signal and an ordinate signal representing a rotational transformation of said error signal and its first derivative respectively through an acute angle, said means including a differentiating amplifier and a summing amplifier, the output of said differentiating amplifier being coupled to the input of said summing amplifier, and function generating means responsive to the abscissa signal which is derived from said differentiating amplifier for generating an ordinate signal which is a function of said abscissa signal represented graphically by a rotationally transformed version of the zero error-acceleration contour characterizing said load in the phase plane, means for algebraically combining said generated ordinate signal with the ordinate signal which is derived from said summing amplifier and with a signal representing the torque applied to said load to provide a control signal, and means responsive to a change in the sense of said control signal for reversing the maximum available corrective effort applied to said load.

10. In a controller for a servomechanism characterized by a zero error-acceleration contour in the plane defined by error and error-rate coordinates, the combination comprising means responsive to an error signal for developing an abscissa signal and an ordinate signal corresponding respectively to said error signal and its derivative in relation to axes rotationally transformed from said error and error-rate coordinates, means responsive to said abscissa signal for generating an ordinate signal which is a function of said abscissa signal represented by a version of said zero error-acceleration contour, and means for combining said ordinate signals to provide a signal representing the required error acceleration for substantially a minimum response time.

11. In a controller for a third-order controlled system characterized by a switching surface including a zero error-acceleration contour, the combination comprising means including a rotational transformation computer for providing an abscissa signal and an ordinate signal representing a rotational transformation of said error signal and its first derivative respectively through an acute angle, function generating means responsive to said abscissa signal for generating an ordinate signal which is a function of said abscissa signal represented graphically by a rotationally transformed version of said zero error-acceleration contour, means for algebraically combining said transformed ordinate signal and said generated ordinate signal with a signal representing error acceleration to provide a control signal, and means responsive to changes in the sense of said control signal for programming the reversal of corrective effort applied to said controlled system.

12. In a position control system, the combination comprising an inertia load, reversible motor means for applying a maximum corrective torque to said load, said load and motor means having a response graphically represented by a family of contours for values of constant error acceleration projected in the phase plane, means responsive to a lack of correspondence between the position of said load and an input signal for developing an error signal, means responsive to said error signal for providing an abscissa signal and an ordinate signal related to said error signal and its first derivative respectively by a rotational transformation through an acute angle, means responsive to said abscissa signal for generating an ordinate signal which is a function of said abscissa signal represented graphically by a version of the zero error-acceleration contour which is substantially tangent to the transformed ordinate axis at the origin, means for algebraically combining said transformed ordinate signal and said generated ordinate signal to provide a signal representing the required error acceleration for a minimum response time, means for comparing the signal representing required error acceleration with a signal representing the existing error acceleration to obtain a control signal, and means responsive to the polarity of said control signal for energizing said motor means in a corresponding sense.

13. In a position control system, the combination as defined in claim 12, wherein said zero error acceleration contour is defined by the relationship $$\dot{\theta}^3 = \theta|\theta|$$

where $\theta$ is the error, $|\theta|$ is the absolute value of the error, and $\dot{\theta}$ is the error rate.

14. In a position control system, the combination as defined in claim 12, wherein the tangent of said acute angle is substantially 2 in normalized units.

References Cited in the file of this patent

UNITED STATES PATENTS

| | | |
|---|---|---|
| 2,088,654 | Hull | Aug. 3, 1937 |
| 2,089,826 | Cunningham | Aug. 10, 1937 |
| 2,463,362 | Doll | Mar. 1, 1949 |
| 2,829,329 | Silva | Apr. 1, 1958 |